United States Patent [19]

Rice

[11] Patent Number: 4,492,354
[45] Date of Patent: Jan. 8, 1985

[54] COLLAPSIBLE STAND FOR ROLLER SUPPORT

[75] Inventor: Verle L. Rice, Cass County, Mo.

[73] Assignee: R. B. Industries, Inc., Pleasant Hill, Mo.

[21] Appl. No.: 459,479

[22] Filed: Jan. 20, 1983

[51] Int. Cl.³ .................................. F16M 11/32
[52] U.S. Cl. .................. 248/163.1; 182/182; 248/188
[58] Field of Search ............... 248/163, 164, 167, 161, 248/431, 188, 188.1, 519, 407, 411, 412, 413, 414; 182/182, 181; 403/371, 372

[56] References Cited

U.S. PATENT DOCUMENTS

| 769,447 | 9/1904 | McKinney | 248/188 |
|---|---|---|---|
| 1,080,441 | 12/1913 | Harris | 248/166 |
| 2,042,443 | 5/1936 | Buckstone | 248/411 |
| 2,374,021 | 4/1945 | Korling | 248/411 |
| 2,633,319 | 3/1953 | Musial | 248/188 |
| 2,653,000 | 9/1953 | Cadwell et al. | 248/188 |
| 3,242,887 | 3/1966 | Haydock | 248/431 |
| 3,741,509 | 6/1973 | Kelly | 248/161 |
| 4,015,806 | 4/1977 | Cattermole | 248/431 |
| 4,031,981 | 6/1977 | Spencer | 182/182 |
| 4,192,076 | 3/1980 | Hall | 248/163 R |
| 4,375,245 | 3/1983 | Schill | 182/182 |

FOREIGN PATENT DOCUMENTS

| 0297305 | 4/1917 | Fed. Rep. of Germany | 248/431 |
|---|---|---|---|
| 0348009 | 1/1922 | Fed. Rep. of Germany | 248/431 |

Primary Examiner—William H. Schultz
Assistant Examiner—Ramon O. Ramirez
Attorney, Agent, or Firm—Kokjer, Kircher, Bradley, Wharton, Bowman & Johnson

[57] ABSTRACT

A collapsible stand for an upright vertical support is the subject of this invention. A U-shaped bracket holds a roller and is mounted on a telescoping stanchion by use of a set screw in the collar of the bracket. The stanchion is in turn supported by a stand, the base portion of which comprises three legs which are bolted to two horizontal plates positioned one above the other. The lower plate is larger than the upper plate and thereby determines the angle of disposition of the legs. The stand is collapsible by disengaging the legs from the plates and dismounting the bracket and roller assembly from the stanchion.

3 Claims, 4 Drawing Figures

COLLAPSIBLE STAND FOR ROLLER SUPPORT

This invention relates to a collapsible stand for an upright vertical support.

Vertical stands are utilized in a wide range of applications for such things as holding music and boards at the proper elevation. It has long been desirous to have a three-legged stand for a vertical support which stand may be collapsed for storage and transport but which is stable when in its working position. Collapsible stands employing a sliding leg brace have long been used by musicians. Such stands are relatively expensive to manufacture and, while adequate for holding a light piece of music, are generally not sturdy enough for holding heavy objects.

In the woodworking industry, vertical roller supports have heretofore been utilized to assist the woodworker in cutting large pieces of lumber. These consist of a roller disposed in a bracket which in turn is mounted on a telescoping stanchion. Because of the need to support relatively heavy objects, roller supports of this type need to be strongly made and heretofore have not been subject to ready disassembly.

It is, therefore, a primary object of the present invention to provide a stand for an upright vertical support which can be broken into a number of small relatively flat pieces when not in use and can be readily assembled into a strong support.

Another one of the objects of my invention is to provide a collapsible stand which eliminates all moving parts and is therefore economical to manufacture.

It is also one of the objects of the present invention to provide a collapsible stand for vertical support which is much sturdier than those stands of the prior art that have heretofore been characterized by moving parts.

One of the aims of my invention is to provide a stand for an upright vertical support which meets the foregoing objectives and is still simple and quick to erect.

A further objective of the invention is to provide a stand meeting the foregoing aims and objects which is particularly adapted to mount a telescoping roller support of the type used in conjunction with woodworking equipment.

Other objects of the invention will be made clear or become apparent from the following description and claims when read in light of the accompanying drawing, wherein:

Figure 1:
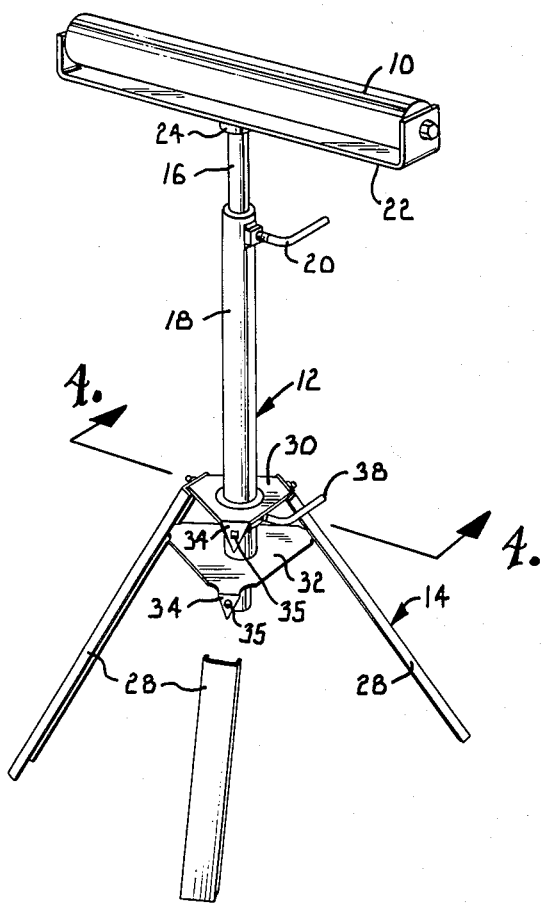
FIG. 1 is a perspective view of the collapsible stand according to the present invention utilized in conjunction with an upright roller support.
Figure 2:
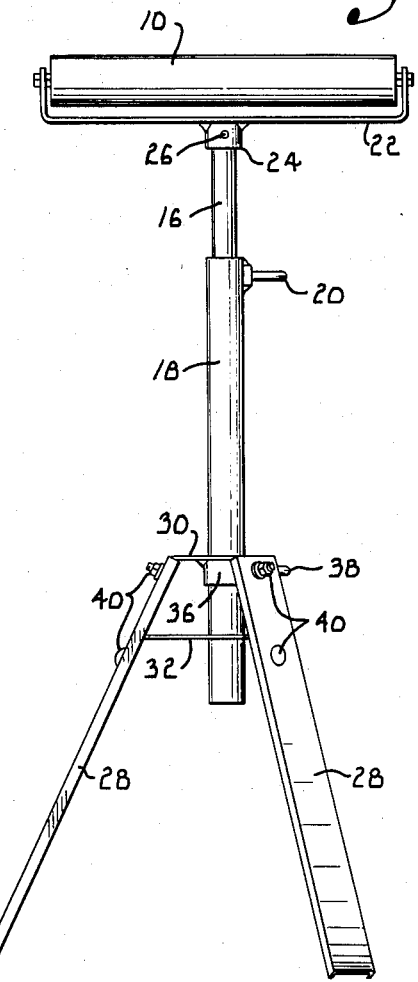
FIG. 2 is an elevational view of the device shown in FIG. 1.

Referring initially to FIG. 1, a roller support 10 is mounted on a telescoping stanchion 12 which is supported by a collapsible stand 14. More specifically, stanchion 12 includes first and second telescoping sections 16 and 18 which may be held in a fixed position relative to each other by an anchor bolt 20.

A U-shaped bracket 22 holds roller 10 and has a collar 24 rigidly fixed to the underside of its bite portion for receiving telescoping section 16. A set screw 26 is provided for assuring a tight fit between section 16 and collar 24.

Figure 4:
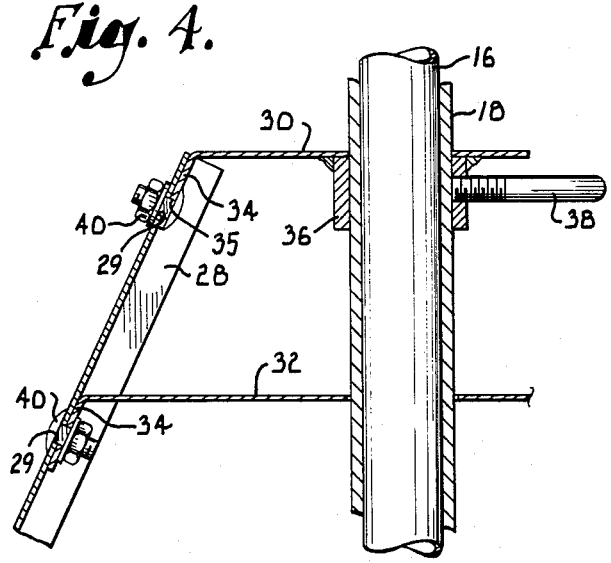
FIG. 4 is a vertical cross-sectional view taken along line 4—4 of FIG. 1.
Figure 3:
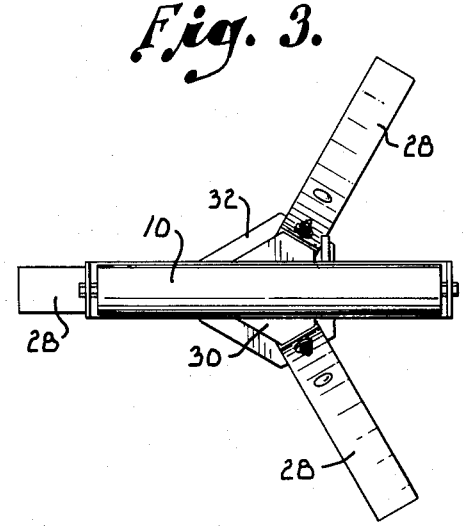
FIG. 3 is a top plan view of the device shown in FIGS. 1 and 2.

Stand 14 has three legs 28 which are held in rigid relationship by first and second plates 30 and 32. Each of the plates is substantially identical except that the second plate 32 is larger than the first plate 30. Plate 30 has three downturned corners which form tabs 34 that are disposed at an acute angle corresponding to the intended angle of disposition of legs 28. Each tab 34 has an opening 35 for alignment with a corresponding opening 29 in one of the legs 28. Plate 30 also has an opening at the center of its primary surface and, as best illustrated in FIG. 4, a collar 36 is aligned with this opening and welded to the bottom side of the plate. An L-shaped bolt 38 is received by the collar 36 and engages outer telescoping section 18 for holding the latter in fixed relationship relative to legs 28.

As indicated previously, second plate 32 is substantially identical to plate 30 except that it is larger and, accordingly, the reference numeral 34 has been used to designate the tabs on plate 32 and the numeral 35 the openings in these tabs. Plate 32 is also provided with cutaway portions to accommodate legs 28. Plate 32 is not provided with collar 36, although same could be included if desired. When legs 28 are properly positioned with their holes 29 in alignment with the holes 35 in tabs 34, nut and bolt fastener assemblies 40 may be inserted into the aligned holes and properly tightened to secure the legs to the plates.

When it is desired to disassemble the stand and support, set screw 26 is loosened thereby permitting bracket 22 to be removed from the upper telescoping section 16. Bolt 38 is then loosened permitting the entire telescoping stanchion to be removed from stand 14. Finally, nut and bolt assemblies 40 are loosened and removed from their openings thereby permitting separation of plates 30 and 32 from legs 28. The widest piece of the disassembled unit is plate 32 and, depending upon the selected dimensions, the longest pieces will be either legs 28 or stanchion 12 when the latter is in its collapsed position.

From the foregoing, it will be appreciated that an improved collapsible stand for a roller support has been provided which meets all of the aims and objects heretofore set forth and therefore represents a significant advance in the art.

I claim:

1. A collapsible stand for mounting an upright vertical support, said stand comprising:
    at least three legs;
    a first plate having an opening for receiving said vertical support,
    said plate having a plurality of downturned tabs at least equal to the number of legs and adapted to be coupled with said legs;
    a second plate adapted to be positioned in spaced apart relationship to said first plate and having an opening aligned with said opening in said first plate,
    said second plate having a plurality of douwnturned tabs at least equal to the number of legs and adapted to be coupled with said legs; and
    fastener means for coupling said plates with said legs.

2. The invention of claim 1, wherein each of said legs is provided with first and second spaced apart openings and each of said tabs of said first and second plates has an opening adapted to be aligned with an opening in one of said legs, said fastener means being adapted to be received by aligned openings in said tabs and legs.

3. A collapsible telescoping roller support comprising:
- a bracket;
- a roller rotatably mounted in said bracket;
- first and second telescoping sections coupled with said bracket and oriented to move said bracket to different vertical heights;
- at least three legs, all adapted to be disposed at an acute angle relative to the horizontal, each leg having first and second spaced apart openings;
- a first plate having an opening for receiving one of said telescoping sections and at least three downturned tabs disposed at an angle corresponding to the intended angle of disposition of said legs, each of said tabs having an opening adapted to be aligned with an opening in one of said legs; and
- a second plate adapted to be positioned in spaced apart relationship to said first plate and having an opening for receiving one of said telescoping sections and at least three downturned tabs, disposed at an angle corresponding to the intended angle of disposition of said legs, each of said tabs having an opening adapted to be aligned with an opening in one of said legs;
- fastener means adapted to be received by each pair of aligned plate and leg openings for coupling said plates with said legs; and
- means for holding said first and second telescoping sections in fixed relationship relative to each other and relative to said legs.

* * * * *